United States Patent [19]

Nemoto et al.

[11] Patent Number: 4,819,017
[45] Date of Patent: Apr. 4, 1989

[54] CAMERA HAVING A FOCAL PLANE SHUTTER

[75] Inventors: Ichiro Nemoto; Ko Aosaki; Atsushi Misawa; Takahito Otora, all of Yotsukaido, Japan

[73] Assignee: Seikosha Co., Ltd., Tokyo, Japan

[21] Appl. No.: 146,331

[22] Filed: Jan. 21, 1988

[30] Foreign Application Priority Data

Jan. 21, 1987 [JP] Japan .................................. 62-11826

[51] Int. Cl.$^4$ ............................................. G03B 17/02
[52] U.S. Cl. .................................................... 354/288
[58] Field of Search ........................ 354/250, 261, 288

[56] References Cited

U.S. PATENT DOCUMENTS 4,067,032  1/1978  Yoshikawa et al. ................ 354/288
4,152,065  5/1979  Kobori ................................. 354/288

Primary Examiner—Michael L. Gellner
Attorney, Agent, or Firm—Bruce L. Adams; Van C. Wilks

[57] ABSTRACT

A camera having a focal plane shutter comprising two sets of blades which are movable to form a slit which opens a shutter aperture includes a body formed from a plastic material. A rail plate having a plurality of film guide rails is attached to the camera body. A plurality of drive shafts are provided on the camera body or the rail plate for supporting at least the blades. The camera body and the rail plate define therebetween a space in which the blades are housed.

4 Claims, 3 Drawing Sheets

CAMERA HAVING A FOCAL PLANE SHUTTER

BACKGROUND OF THE INVENTION

1. Field of the Invention

This invention relates to a camera having a focal plane shutter. More particularly, it relates to a camera body housing a focal plane shutter.

2. Description of the Prior Art

A recent demand for a lighter-weight and lower-priced camera has been making it necessary to develop a lighter-weight and lower-priced shutter. There has been proposed a shutter plate made of a plastic material, as described in Japanese Utility Model Application No. 138990/1986 filed by the assignee of the present application. A camera body which is made of a plastic material is already commercially available. This camera body has, however, a greater wall thickness than that of a metal body, so that it may make up for the lower mechanical strength of the plastic material. This increase in wall thickness of the camera body tends to result in a larger camera, contrary to the demand for a smaller camera. This problem is particularly noticeable with a camera of the type having a body in which a shutter of the unitary construction is incorporated. An increase in distance between the film plane and the shutter plane is very likely to bring about a reduction in shutter efficiency and thereby the lack of uniformity in exposure.

Reference is now made to FIGS. 4 and 5 showing a conventionally known structure by way of example. A camera body 10 has a central aperture 11 and defines a housing 12 for a film magazine on one side of the aperture 11 and a housing 13 for a takeup spool on the other side thereof. The camera body 10 is also provided above the aperture 11 with a plurality of threaded holes 14 for receiving screws 36 for securing a shutter assembly 30 to the camera body 10. The shutter assembly 30 includes a base plate 33 having a central opening 33a and a holding plate 34 positioned behind the base plate 33. The base plate 33 and the cover plate 34 are spaced apart from each other and define therebetween a space in which a plurality of shutter blades are provided. The base plate 33 is provided along one vertical edge thereof with a mechanism 35 for moving the shutter blades for film exposure. The shutter is of the type which is well known in the art, as disclosed, for example, in Japanese Utility Model Application No. 138990/1986, and no further description will, therefore, be made of the specific construction of the shutter per se. The base plate 33 is provided with a plurality of lugs 33b projecting from its upper edge. Each lug 33b has a hole 33c which is aligned with one of the threaded holes 14 in the camera body 10, so that each screw 36 may be passed through one of the holes 33c into the corresponding hole 14.

The body 10 is provided on its rear surface with a plurality of film guide rails, as shown at 15 in FIG. 5. The guide rails 15 consist of two sets of rails, i.e., an upper set of rails and a lower set of rails. Each set of rails consist of an outer rail 15a and an inner rail 15b. The back cover of the camera contacts the outer rails 15a when it is closed. The film has its upper and lower edges held in contact with the inner rails 15b and travels in parallel to the outer rails 15a.

The known structure as hereinabove described has a number of disadvantages which are due to the fact that the shutter assembly 30 is fixed to the camera body 10 by the screws 36. This construction increases the distance $L_1$ between the film plane and the shutter blade plane if the camera body 10 or the shutter assembly 30 is formed from a plastic material. This undesirably enlarges the camera and lowers its shutter efficiency.

SUMMARY OF THE INVENTION

Under these circumstances, it is an object of this invention to provide a camera having a focal plane shutter which can substantially be made of a plastic material, but which is small and has a high shutter efficiency.

This object is attained by a camera having a focal plane shutter comprising two sets of blades which are movable to form a slit which opens a shutter aperture, characterized in that it comprises a camera body formed from a plastic material, a rail plate attached to the camera body and having a plurality of film guide rails, and a plurality of drive shafts provided on the camera body or the rail plate for supporting at least the blades, the camera body and the rail plate defining therebetween a space in which the blades are housed.

According to this invention, the mechanism for actuating the shutter, the shutter blades and the rail plate are incorporated in the camera body and the cover plate as hereinbefore described with reference to the prior art is no longer required. The elimination of the cover plate and therefore the space thereby occupied makes it possible to reduce the distance between the film plane and the blade plane and thereby realize an improved shutter efficiency.

It has hitherto been necessary to provide a space which makes up for any dimensional error of the camera body and the shutter assembly which is incorporated therein. According to this invention, no such space is required, but it is possible to obtain a small camera made of a plastic material.

The camera of this invention also includes a removable cover which facilitates the exchange of the shutter blades which are liable to damage, while it is not necessary to disassemble the whole camera body on any such occasion.

DETAILED DESCRIPTION OF THE INVENTION

Figure 1:
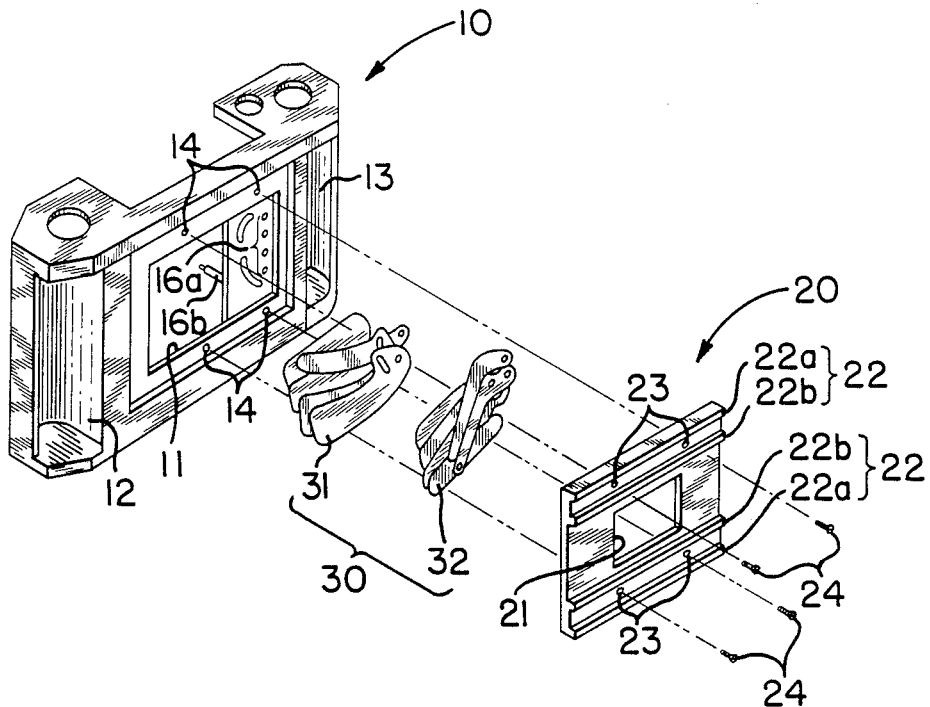
FIG. 1 is an exploded perspective view of a camera embodying this invention.
Figure 2:
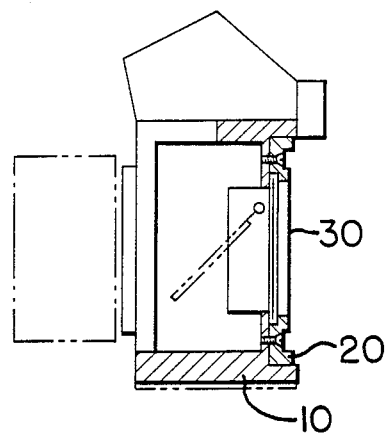
FIG. 2 is a side elevational view, partly in section, of the camera shown in FIG. 1, with its parts put together.
Figures 3, 5:
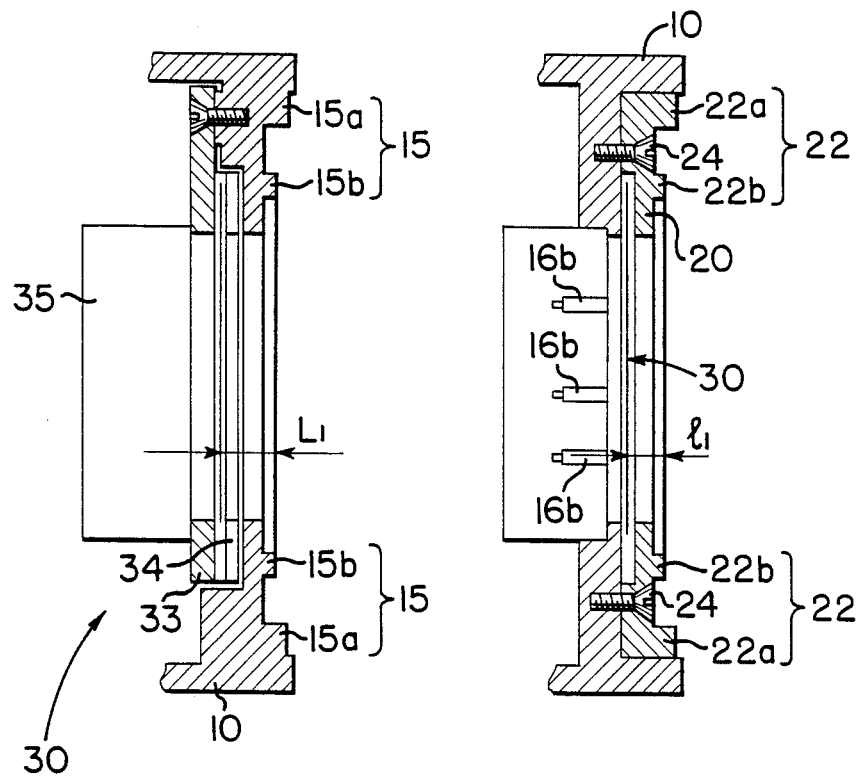
FIG. 3 is a fragmentary enlarged view of the camera shown in FIG. 2.
FIG. 5 is a fragmentary enlarged side elevational view, partly in section, of the camera shown in FIG. 4.
Figure 4:
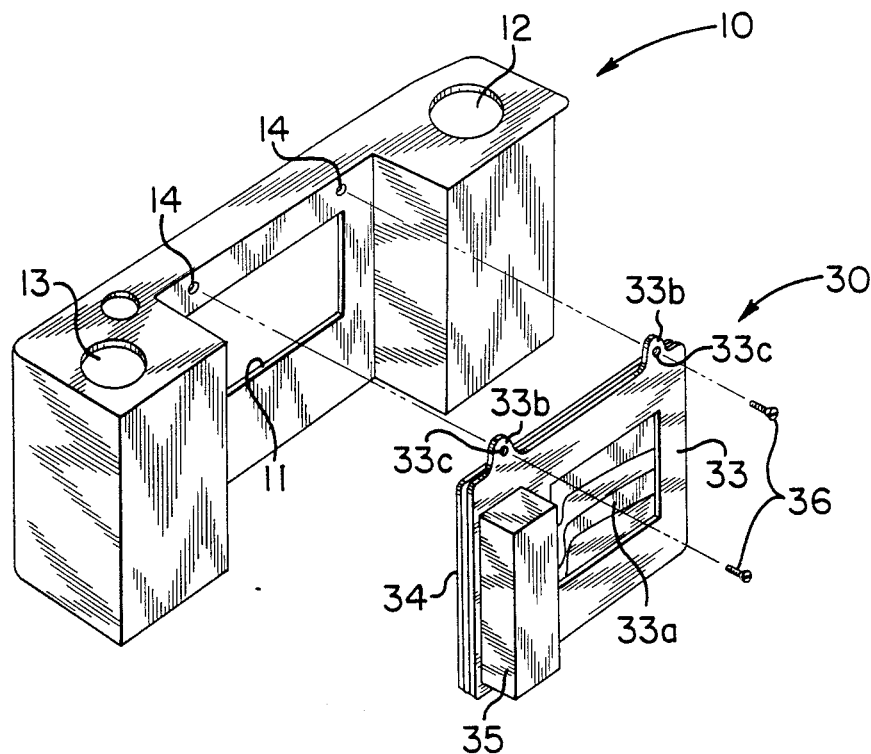
FIG. 4 is a fragmentary exploded view of a known camera having a focal plane shutter.

A camera embodying this invention is shown by way of example in FIGS. 1 to 3. Like numerals are used to indicate like parts throughout FIGS. 1 to 3 and FIGS. 4 and 5 showing the prior art, so that no repeated description of any similar parts may be necessary.

The camera includes a body 10 which is provided with a plurality of blade guide posts 16a and a plurality of drive shafts 16b carrying a lever for controlling the shutter operation. A shutter comprises a front set of blades 31 and a rear set of blades 32. A rail plate 20 has a substantially central aperture 21 and two sets of film guide rails 22 between which the aperture 21 is provided. Each set of rails 22 consists of an outer rail 22a and an inner rail 22b. The rails are of the same construction as those which have hereinbefore been described with reference to the prior art, and no further description thereof will, therefore, be made. The camera body 10 has a plurality of threaded holes 14 above and below its central aperture 11. The rail plate 20 has above and below its central aperture 21 a plurality of holes 23 each of which is aligned with one of the threaded holes 14.

The shutter operating mechanism including the lever is positioned within the camera body 10 adjacent to its front side and supported on the drive shafts 16b. The front and rear blades 31 and 32 are positioned within the camera body 10 adjacent to its rear side and supported rotatably on the posts 16a. The rail plate 20 is positioned on the rear side of the camera body 10 and secured thereto by a plurality of screws 24 each extending through one of the holes 23 into the corresponding threaded hole 14.

The camera body 10 also carries a mirror box and a mount on its front side, and a top decorative cover and a bottom cover. None of them, however, forms an essential part of this invention and is, therefore, described in any further detail.

As is obvious from the foregoing description, the camera of this invention does not include the holding plate of the type which has been necessary in the known camera. Therefore, the blade plane and the film plane have a smaller distance $L_1$ therebetween in the camera of this invention, as is obvious from a comparison of FIGS. 3 and 5. The camera of this invention has, therefore, a smaller size and a higher shutter efficiency.

Although the drive shafts have been shown as being provided on the camera body, it is alternatively possible to provide them on the rail plate.

What is claimed is:

1. In a camera having a focal plane shutter comprising two sets of blades which are movable to form a slit which opens a shutter aperture, the improvement which comprises:
    a camera body formed from a plastic material;
    a rail plate attached to said body and having a plurality of film guide rails; and
    a plurality of drive shafts provided for supporting at least said blades;
    said body and said rail plate defining therebetween a space in which said blades are housed.

2. A camera as set forth in claim 1, wherein said shafts are provided on said body.

3. A camera as set forth in claim 2, further including a shutter operating mechanism supported on said shafts, said blades being rotatably supported between said body and said rail plate.

4. A camera as set forth in claim 1, wherein said shafts are provided on said rail plate.

* * * * *